Sept. 22, 1936.   O. KAISER   2,055,294
SHOVEL TOOTH FURROW CORN HARROW
Filed Jan. 2, 1936
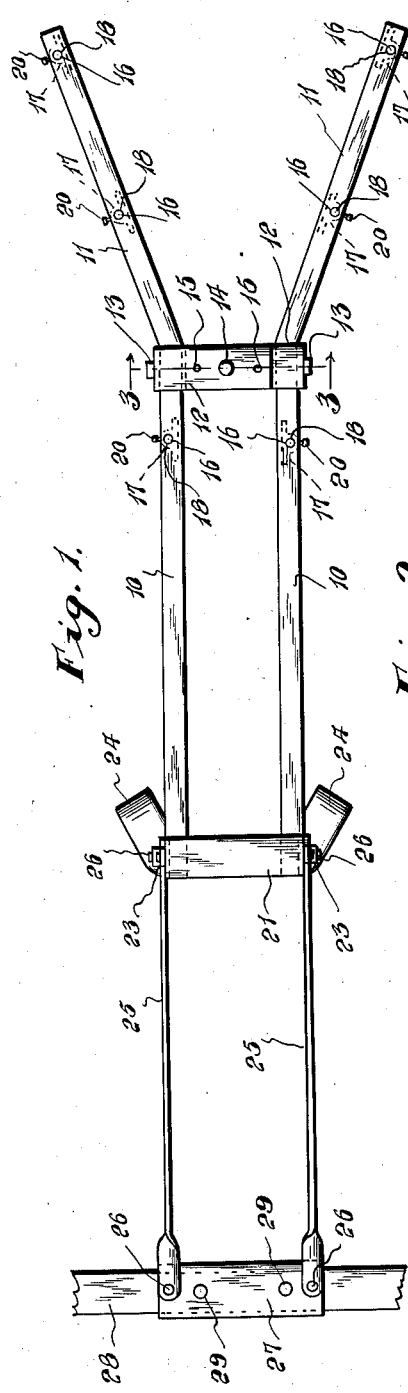
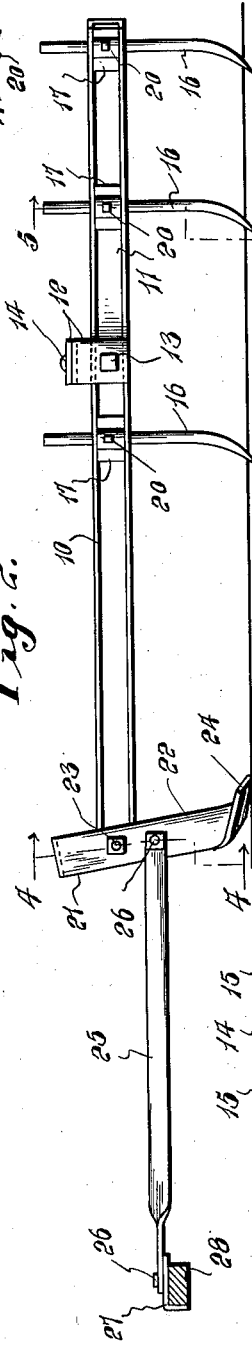
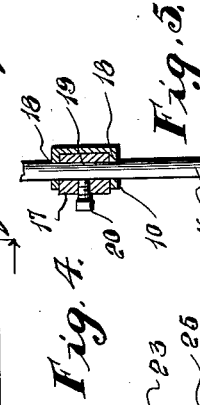
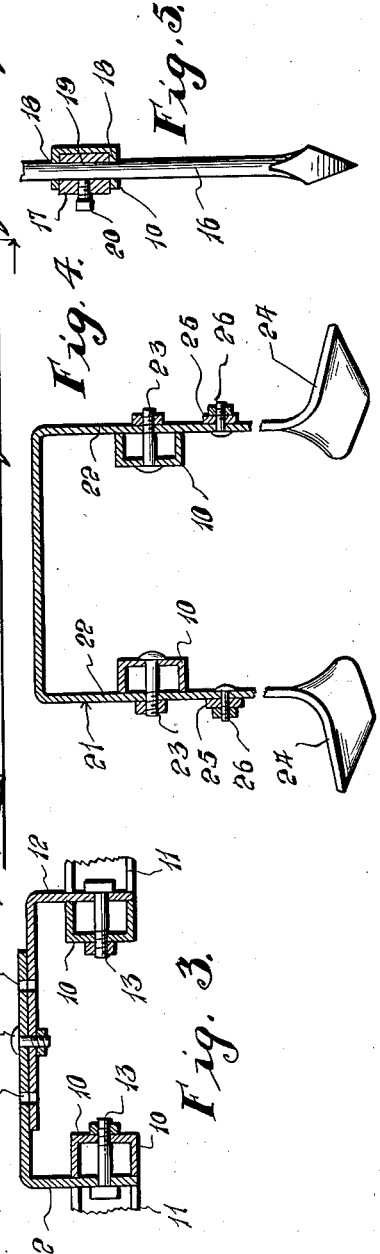
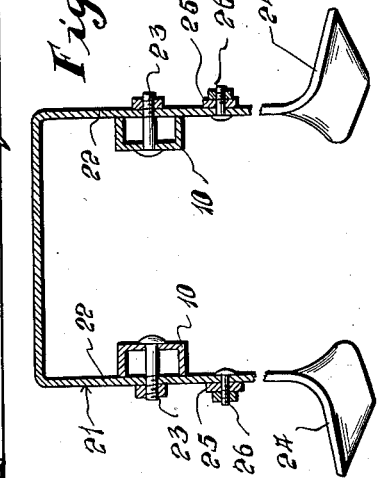
Inventor
Oltman Kaiser,
By L. F. Randolph Jr.
Attorney Patented Sept. 22, 1936

2,055,294

UNITED STATES PATENT OFFICE 2,055,294

SHOVEL TOOTH FURROW CORN HARROW

Oltman Kaiser, Gothenburg, Nebr.

Application January 2, 1936, Serial No. 57,272

4 Claims. (Cl. 55—3)

This invention relates to a harrow particularly adapted for use in harrowing small listed corn.

It is particularly aimed to provide a construction for use in the bottom of the furrow for the purpose of breaking up the crust and killing the weeds both in the furrow and around the corn.

The more specific objects and advantages will become more apparent from a consideration of the description following, taken in connection with accompanying drawing illustrating an operative embodiment.

Drawing:—

Figure 1 is a plan view of the harrow constructed in accordance with the invention;

Figure 2 is a side elevation of such harrow;

Figure 3 is a cross-sectional view taken on the plane of line 3—3 of Figure 1;

Figure 4 is a cross sectional view taken on the plane of line 4—4 of Figure 2, and Figure 5 is a vertical sectional view taken on the line 5—5 of Figure 2.

Referring specifically to the drawing wherein like reference characters designate like or similar parts, 10 designates harrow beams preferably having diverging rear portions 11. Such beams adjacent to junction of the main and diverging portion 11 are adjustably connected together by means of brackets 12 which are bolted as at 13, one to each beam, and bolted to each other as at 14. Each bracket has a plurality of openings 15, capable of being collectively brought into registration to accommodate the bolt 14.

Said beams are channel shape in cross section and the channels are disposed outermost. The beam 10, carries harrow teeth 16, preferably of the shovel type, and arranged at any desired location. Its clamping blocks 17, are disposed in the channels of the beam and the upper portions of the teeth 16, extend through opening 18, in the upper and lower flanges of the beams and in opening 19, alined therewith. Set screws 20, are threaded to the block 17, and are adapted to a binding engagement with the teeth 16, to hold them rigidly in place and in adjusted position.

At the forward end of the beams-end is a U-shaped frame 21, having side members 22 bolted as at 23 to the beams in a rigid manner. The lower ends of such side members 22 are formed into runners 24, which adjust the tip of the harrow.

Strap irons 25, are bolted at 26 to the side members 22, below the bolt 23, and such straps 25, at their forward ends are loosely or pivotally connected at 26 to an angle member or bar 27.

As many of the implements may be employed as desired and they are connected by means of the straps 27 to a hitch 28, which is adapted to be drawn by an animal or mechanical power as desired. Bolts 29 may fasten the straps to angle members 27, to the hitch.

It will be understood that the device is used in connection with small listed corn and that the harrow runs in the bottom of the furrow, breaking up the crust and killing the weeds in the furrow and around the corn.

Various changes may be resorted to provided they fall within the spirit and scope of the invention.

I claim as my invention:—

1. A harrow of the class described having beams, frame connecting the forward ends thereof, said frame having legs, the bottoms of said legs having runners, and teeth carried by said beams.

2. A harrow of the class described having beams, frame connecting the forward ends thereof, said frame having legs, the bottoms of said legs having runners, and teeth carried by said beams, said beams having relatively diverging portions, and brackets connected to the beams and to each other adjacent said portion.

3. A harrow of the class described having beams, frame connecting the forward ends thereof, said frame having legs, the bottoms of said legs having runners, and teeth carried by said beams, said beams being of channel form, blocks in the channels, said blocks and the flanges of the beams having aligned openings through which the teeth pass, and fastening elements on the blocks for the teeth.

4. A harrow of the class described having beams, frame connecting the forward ends thereof, said frame having legs, the bottoms of said legs having runners, and teeth carried by said beams, bars pivotally connected to said side members below the beams, and hitch means for said bars.

OLTMAN KAISER.